April 6, 1937.    H. L. BLUM    2,076,263
LIQUID DISPENSING DEVICE
Filed May 1, 1933
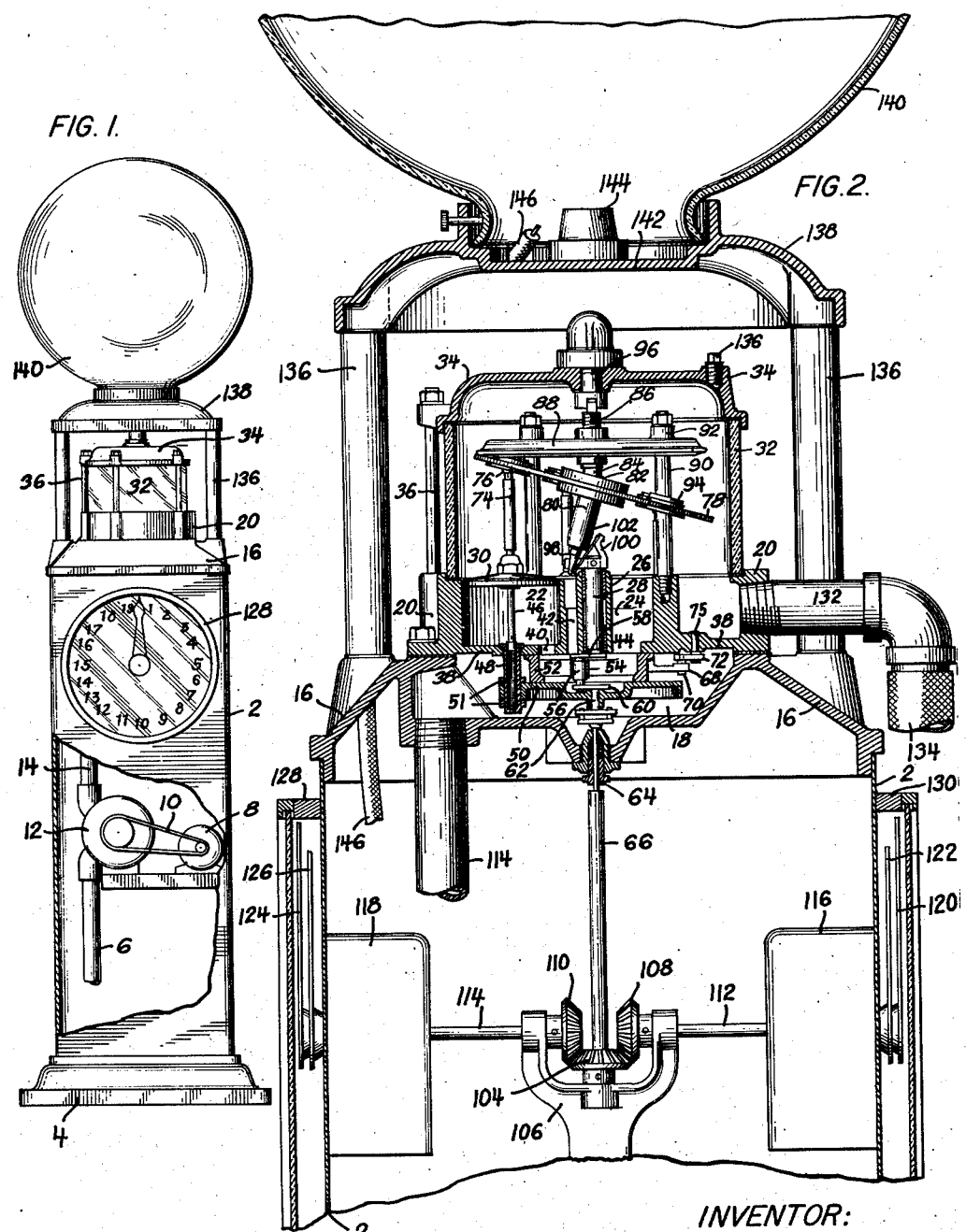
INVENTOR:
HOSMER L. BLUM.
BY:- Cox & Moore
ATT'YS.

Patented Apr. 6, 1937

2,076,263

UNITED STATES PATENT OFFICE 2,076,263

LIQUID DISPENSING DEVICE

Hosmer L. Blum, San Francisco, Calif.

Application May 1, 1933, Serial No. 668,796

7 Claims. (Cl. 73—239)

My invention relates to liquid dispensing devices of general application and comprising an improvement in meters of the character shown in my Patent No. 1,985,400.

The invention is shown illustratively as adapted to a gasoline dispensing device.

Among the objects of my invention are to provide a liquid or gasoline dispensing device of the meter pump type comprising a bowl wherein the meter is disposed in the pump housing with the bowl located uppermost and wherein the bowl is formed of transparent material whereby the motion of certain of the meter mechanism as well as the liquid passing through the dispensing pump can be easily seen through the transparent bowl. Another object of my invention resides in providing a novel type of meter of the displacement type for utilization as a combined meter and sight glass for a liquid dispensing apparatus. These and other objects of my invention will be apparent from a perusal of the following specification when taken in connection with the following drawing, wherein—

Fig. 1 is a perspective view of a liquid or gasoline dispensing pump with my combined meter and sight glass;

Fig. 2 is a sectional view showing the construction of the same.

Referring now to the drawing in detail, the invention comprises in general a meter pump embodying any desired type of housing 2, adapted to be supported on a base 4, the housing enclosing an inlet conduit 6, adapted to be connected to a source of liquid or gasoline supply, such as the usual underground tank. This pipe 6 is preferably provided with the usual foot valve, not shown but well known in the art. In addition, the housing 2 supports a motor 8 adapted to drive, by means of a belt 10, a rotary pump 12 which discharges gasoline through a conduit 14. Interposed between the conduit 14 and the meter hereinafter described, may be disposed any desired type of air separator, well known in the art, and which is not shown herein as it forms no part of the present invention.

Heretofore it has been customary, in meter pumps, to force the liquid through the displacement meter which discharges in turn to a sight glass generally positioned on the outside of the housing, and which sight glass, in turn, discharges into the usual flexible hose. As is well known in the art, the sight-glass generally contains an element movable with or about a moving column of liquid to inform the operator that the liquid is flowing. In the absence of such a movable element and where the liquid being dispensed is clearly transparent, it is very difficult and sometimes impossible for an operator, looking at a sight-glass, to determine whether or not the liquid column is moving, and hence the necessity of putting an element in the sight-glass that is movable by and with the movement of the liquid column. In addition, this sight-glass forms a means for informing the operator that the foot valve is not leaking during the interval between two successive dispensing operations, since a liquid level is maintained in the sight-glass by the foot valve. The flexible hose is generally provided with a valve-controlled nozzle. In the present invention I have constructed the meter so that it functions not only as a liquid measuring device, but also as a sight glass and whereby I am enabled to eliminate the extra sight glass heretofore provided.

In my present construction the discharge pipe 14 from the pump discharges into a bottom casting 16 mounted in any desired manner at the top of the housing 2, suitable re-inforcing interior supports being provided, if desired. This bottom casting 16 is formed to provide a central hollow liquid chamber 18 in which the valve mechanism is housed. Bolted to the top of this base 16 is a substantially annular upper base member 20 in which are formed the displacement cylinders 22, there being a series of the same disposed concentrically about the axial center of this base member 20. These cylinders are separated by a spider-portion 24 which spider-portion is provided with an axially disposed hollow sleeve 26 forming a bearing for a shaft 28 hereinafter described. Pistons 30 are adapted to reciprocate in the cylinders. The top of the upper base member 20 is provided with a seat in which rests a glass cylinder 32. A crown 34, preferably of metal, closes the upper portion of the cylinder 32, making a liquid-tight and air-tight joint therewith. A series of bolts and nuts 36 clamp the crown, glass cylinder and the upper base member in fixed position. The upper base member 20 is closed at its bottom by means of a plate 38 which is ported as at 40 for each cylinder and also is provided with openings 42 and 44 communicating with the interior of the cylinder 32, as hereinafter described. Each piston 30 is provided with a stem 46 which is adapted to reciprocate in a sleeve 48 threading into an opening in the bottom portion 38, concentrical with each cylinder. Each one of these sleeves forms a rigid support for an end plate 50, which plate is provided with a series of perforations adapted to slip over the sleeve 48, suitable nuts or locking devices 51 being present for holding the plate 50 in rigid position.

Operatively associated between the plate 50 and the under surface of the closing plate 38 is disposed a valve 52 having a central bearing 54 joined to the rim portion of the valve by means of spiders so that liquid can pass through the valve. The rim of the valve is the portion thereof which opens and closes the ports 40 and 44 permitting flow of liquid from the chamber 18 into the cylinder 22 when the valve is shifted to one position, and then permitting the expulsion of the liquid by the piston 30 through the port 44 into the cylinder 32 when the valve is shifted in another position.

The bearing 54 of the valve is arranged to receive a stub shaft 56 co-axially thereof, the upper portion of which shaft connects by means of a crank 58 with the central shaft 28. The lower portion of the shaft 56 is connected by means of a crank 60 with still another shaft 62 having a bearing in the central portion of the plate 50. Shaft 62, in turn, connects with a shaft 64 which passes through the center of the bottom 16 and connects by means of a joint with a shaft 66 hereinafter described. It will thus be seen that the bottom plate 50 not only closes the bottom of the perforated valve 52, but also forms a means for holding this valve 52 firmly on its seat so as to co-act with the ported cylinders and cylinder block 20. In order to prevent the valve 52 from rotating about its axis, I have provided it at its periphery with an outstanding arm 68 carrying a pin 70 adapted to pivot in another arm 72 pivotally carried on a pin 75 mounted in the base member 38. Each one of the pistons is provided with an upstanding rod 74 which connects by means of a ball and socket connection 76 with a plate 78. The central portion of the plate 78 is provided with a centrally disposed drive arm 80 which has a central socket adapted to be pivotally mounted on a ball 82 mounted on a depending adjustable ball-arm 84 passing screw-threadedly as at 86 through a cross head 88. This cross head is held from rotation by means of a series of spacer posts 90, which are rigidly connected as at 92 to the cross head. These posts pass downwardly freely through circular slots 94 formed in plate 78. The bottom of the posts 90 rigidly screw into threaded openings in the cylinder block 20. The details of the construction and arrangement of the plate 78, piston rod 74 and arm 80 are disclosed in my Patent No. 1,985,400 aforesaid. The upper end of the adjusting screw 86 is provided with a connection to an adjusting member 96 passing through the upper portion of the dome 34 for making the necessary adjustments of the strokes of the pistons as is set forth in my patent aforesaid.

The bottom of driving arm 80 is tapered as at 98 and rides between a forked end of a somewhat L-shaped bracket 100 which is pinned to the upper end of the shaft 28; the vertical leg of this bracket is provided with a leaf spring 102 which rides between the forks of the horizontal leg and presses against the tapered end 98 of the member 80.

The shaft 66 is provided on its lower end with a gear 104 mounted on the shaft which turns in a wide bracket 106. This bevel gear 104 meshes with two opposed beveled gears 108 and 110, the former gear being mounted on a shaft 112 and the latter on a shaft 114. These shafts communicate and operate the opposed register mechanisms 116 and 118 having hands 120 and 122, and 124 and 126 viewable through dial housings 128 and 130 arranged on opposite faces of the housing 2.

The cylinder block 20 is provided with an outlet 132 which is adapted to communicate with the flexible dispensing hose 134 normally extending outside of the housing 2 and provided, as usual, with a valve-controlled nozzle. The crown 34 of the bowl may be provided with a threaded plug 136 for permitting the escape of air from the top of the bowl upon removal of this plug.

I preferably mount, on the top of the base member 16, four upstanding posts 136 which are hollow and form housings for elongated bolts which pass through a crown member 138 forming a topmost portion of the housing pedestal. This crown portion is provided with a central seat for the illuminable bowl 140. The central portion of the crown member 138 is formed as a spider 142 on which is mounted a lamp bracket 144 for the electric light bulb. The light from the bulb may shine through the spider to provide an illumination about the bowl. One of the hollow pedestals 136 may form a conduit for the electrical wiring 146 leading to the lamp bracket 144.

Having thus described the construction of my improvement, it will be seen that in operation the pump 12 forcing liquid under pressure through the conduit 14, the liquid will pass into the chamber 18 and, when the valve 52 moves to uncover port 40, the gasoline or the liquid will enter port 40 into the cylinder to displace one of the pistons 30 upwardly. Upon reverse reciprocation the liquid will be dispensed from the cylinder through the central portion of the valve, and in through the port 44, through the apertures between spider 24 of the central openings in the cylinder block 20, thence into the chamber formed by the inverted bowl, thence out through discharge port 132 to the dispensing hose. Displacement of the pistons actuates the wobble plate 78 in the usual manner to rotate the shaft 28 to cause gyration of the valve 52 and through the crank mechanisms, rotation of the shaft 66 to actuate the opposed register mechanisms of the meter. The purchaser, and operator of the dispensing mechanism, can readily see that liquid is flowing through the system by perceiving movement of the piston rods and nutating plate 78 through the transparent bowl 32 thus eliminating any necessity for a sight glass, and during the interval between successive dispensing operations the liquid will stand at a fixed height within the bowl 32 to inform the operator that the foot valve is not leaking.

It will thus be seen that by placing the meter at the top of the pump housing, and particularly in inverting the bowl and placing it above the register mechanism I am enabled to use the compact relationship of the meter, including its bowl and register mechanism, not only as a meter, but also as a sight glass to enable the purchaser to see that liquid is flowing in the system during the dispensing operation.

Because of the location of the measured liquid receiving chamber at the top of the pump housing, the highest point in the fluid system, it is enabled to perform all the functions of a sight glass. It is obvious that any gases which may form in the system would tend to rise to the highest point therein and in the disclosed structure such gases would collect in the transparent chamber. Further, any deficiency of fluid in the system due to leaks occurring therein will be made up by liquid which flows by gravity from said chamber. Thus it will be seen, any air or leaks in the system will be indicated by a lowered level of liquid in the transparent chamber.

Similarly, if the operator had failed to prime the system before attempting to deliver liquid therefrom, the fact that there is no liquid or a lowered level of liquid in the transparent chamber will indicate the unprimed condition to an observer.

Having thus described my invention, what I claim as new and desire to obtain by Letters Patent of the United States is:

1. In a liquid dispensing device, a meter comprising a block provided with a plurality of cylinders disposed circularly in said block, a piston in each cylinder, said block having a central opening forming a channel, dome means on and extending above said block and forming a receiving chamber communicating with said channel, means secured on the underside of said block and forming a liquid inlet chamber, said cylinders having each a port opening on the underside of the block, valve means in said inlet chamber controlling said cylinder ports and shiftable to communicate the ports alternately with the inlet chamber and with the channel communicating through the block with said receiving chamber, driving mechanism extending in said receiving chamber and in said channel for interconnecting said pistons with said valve means, said block being formed with an outlet opening communicating with said receiving chamber, and said dome means being transparent to freely reveal the mechanism and liquid within the receiving chamber.

2. In a liquid dispensing device, a meter comprising a block portion, measuring mechanism on said block portion and extending outwardly on at least one side of said block portion, transparent means comprising a tubular element sealingly seated on end on said block portion in position to enclose the exposed portions of said measuring mechanism on one side of said block portion so that exposed portions are visible from all sides of said meter, cover means sealingly enclosing the outer end of said tubular member, said transparent tubular member forming a receiving chamber, means forming a liquid inlet to said measuring mechanism whereby liquid may be drawn into said meter, measured, and delivered into said receiving chamber, and means to remove the measured liquid from said receiving chamber.

3. In a liquid dispensing apparatus having a liquid dispensing conduit, a metering mechanism, and transparent means housing a portion of said mechanism to form a chamber for receiving and displaying measured liquid, said chamber being connected with said conduit so as to form the highest portion thereof whereby any leaks in or lack of priming of said conduit will result in a reduction of the amount of liquid in the chamber.

4. In a liquid dispensing apparatus, a metering mechanism, including means to form a metering chamber, means including a conduit for supplying unmeasured liquid to said chamber, transparent means housing a portion of said mechanism to form a chamber adapted to receive measured liquid from said mechanism, a conduit connected to the latter chamber and adapted to receive liquid therefrom, said latter chamber being arranged above said conduits and mechanism so that any leakage in or unprimed condition of the apparatus will be evidenced by a lowering of the liquid level in said latter chamber.

5. In a liquid system for a dispensing apparatus, a metering mechanism, means associated with said mechanism to form a container for receiving unmeasured liquid and supplying it to said mechanism, transparent means housing a portion of said mechanism to form a chamber for the reception and display of measured liquid discharged from said mechanism, said chamber being so connected in said liquid system that any deficiency of fluid in the system will be made up by liquid from said chamber and will be indicated by a lowered level of liquid in said chamber, said transparent means serving also to display movable elements of said mechanism to indicate whether or not the metering mechanism is being operated during a dispensing operation.

6. In a liquid dispensing apparatus, a metering mechanism, means including a transparent bowl housing a portion of said mechanism to form a chamber for receiving and displaying liquid discharged by said mechanism, said chamber forming the highest element in the flow system which conducts liquid through the dispensing apparatus, and means in said chamber for removing gases which may accumulate therein.

7. In a liquid dispensing apparatus, a combined liquid meter and sight glass including a cylinder block, pistons fitted in said cylinders, a valve for controlling the operation of said pistons, means connecting said pistons and valve for operation in a predetermined manner, transparent means located above and cooperating with said block, pistons, and valve to form a chamber which houses and displays the connecting means, which receives and displays liquid measured by the mechanism, and which serves to indicate the presence of gases in the dispensing apparatus.

HOSMER L. BLUM.